M. D. LEWIS.
DEVICE FOR TEACHING NUMBERS.
APPLICATION FILED MAY 7, 1915.

1,151,279.

Patented Aug. 24, 1915.

Witnesses

Margaret L. Riggs

Helen L. Woodworth

Inventor

May D Lewis

UNITED STATES PATENT OFFICE.

MAY D. LEWIS, OF WATERTOWN, NEW YORK.

DEVICE FOR TEACHING NUMBERS.

1,151,279.  Specification of Letters Patent.  Patented Aug. 24, 1915.

Application filed May 7, 1915. Serial No. 26,647.

*To all whom it may concern:*

Be it known that I, MAY D. LEWIS, a citizen of the United States, residing at Watertown, in the county of Jefferson and State of New York, have invented a new and useful Device for Teaching Numbers, of which the following is a specification.

This invention is for the purpose of teaching the names and values of the ten digits, and the forty-five combinations used in addition and subtraction. I attain these objects by the device illustrated in the accompanying drawings. This device is to be hung on the wall.

Figure 1:
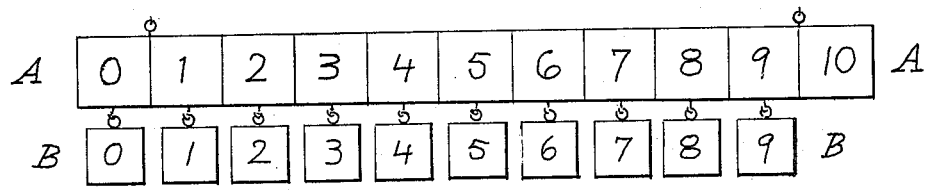
Figure 2:
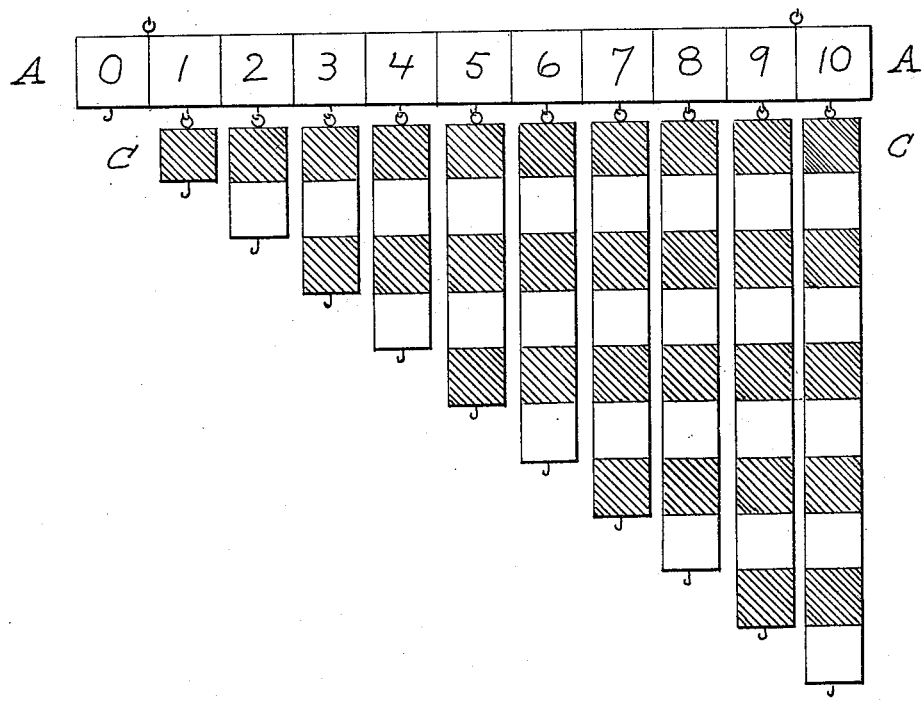

Figure 1, shows the device as used to teach the names of the digits. Fig. 2, shows the the device as used to teach the value of the digits, and also the forty-five number combinations.

This device may be constructed of either thin wood or of very heavy paper cardboard. In this application, wood will be named as the material used.

A A as shown in drawing, is a bar of thin wood. Its length is eleven times its width, so as to equal eleven squares, in each of which is placed a number from 0 to 10 in sequence, as illustrated. At the bottom of each square is a small hook.

B B are ten separate squares, each an eighth of an inch smaller than the squares of the bar. Each square has written on it, one of the ten digits. In the center of the top of each square is fastened a ring, so that the square can be easily placed on the hook beneath its corresponding figure on the bar. These squares are to be hung on the hooks of the bar, the pupil locating them by comparison with the figures on the bar. This exercise and similar ones with this device teach children the name of the digits in a very short time.

Fig. 2, C C, shows the remaining part of the device, which is a series of ten bars arranged in sequence from one to ten. The width of each bar is a little less than the width of the bar A. The length of the first bar is the same as the width, that of the second twice the width, and so on up to ten times the width of the first bar. Each bar is colored on one side only in alternate light and dark squares, the first square being dark, as shown in drawing. Each bar has in the center of its top a ring and in the center of the bottom a hook. These rings and hooks are for connecting the bars C C with the bar A A, and with each other. Thus the bars can be hung from bar A each under its corresponding figure, as 1 square under 1, 2 squares under 2, etc. Exercises in hanging these bars, each in its proper place, will teach the comparative values of the ten digits. Also hanging one bar on another, to see which bar the combination equals, is a great aid in learning the number combinations; as, 1 hung on 4, 2 on 3, will show the series equal in each case to 5. In the same way, the series of combinations for each number up to 18 can be made. As 1 can be placed on 10 to make 11, and then its series of combinations found; 10 and 2 for 12, 10 and 3 for 13, and so on up to eighteen. Thus there can be shown in concrete and manageable form suitable for class instruction all the forty-five number facts used in addition and subtraction.

I claim—

A device for teaching arithmetic, consisting of a long bar carrying a series of numbered squares, a series of separate numbered squares, and a series of bars comprising a unit bar and bars whose lengths are multiples of the unit bar, all attachable to the long bar and to each other by hooks and rings, as herein described.

Signed in the city of Watertown, county of Jefferson, State of New York, this 5th day of May, 1915.

MAY D. LEWIS.

Witnesses:
 MARGARET L. RIGGS,
 V. WANSTEN,

Copies of this patent may be obtained for five cents each, by addressing the "Commissioner of Patents, Washington, D. C."